United States Patent [19]

Kohn et al.

[11] 4,160,078

[45] Jul. 3, 1979

[54] POLYMERS CONTAINING LATERALLY SUBSTITUTED ISOCYANATE GROUPS AND THEIR PREPARATION

[75] Inventors: David H. Kohn, Haifa; Aharon Liebersohn, Kiryat Bialik, both of Israel

[73] Assignee: Technion Research and Development Foundation, Ltd., Haifa, Israel

[21] Appl. No.: 703,536

[22] Filed: Jul. 8, 1976

[51] Int. Cl.$^2$ .................. C08F 4/04; C08F 26/00; C08F 20/70
[52] U.S. Cl. .................. 526/218; 526/75; 526/227; 526/230; 526/232; 526/293; 526/305; 526/312
[58] Field of Search .................. 526/23, 52, 75, 312, 526/218, 227, 232, 230, 293, 30 T

[56] References Cited

U.S. PATENT DOCUMENTS

| | | | |
|---|---|---|---|
| 2,334,476 | 11/1943 | Coffman | 526/312 |
| 2,606,892 | 8/1952 | Krupa et al. | 526/312 |
| 3,242,140 | 3/1966 | Hoover | 526/75 |
| 3,551,390 | 12/1970 | Krimm et al. | 526/75 |
| 3,658,670 | 4/1972 | Holicky et al. | 204/159.19 |
| 3,929,744 | 12/1975 | Wright | 526/23 |

FOREIGN PATENT DOCUMENTS 0947472  1/1964  United Kingdom ............... 526/312

OTHER PUBLICATIONS

C.A. vol. 72-90317x (1970) Deryckere et al.

*Primary Examiner*—Herbert J. Lilling

[57] ABSTRACT

Polymers containing laterally substituted isocyanate groups, prepared from acyl azide monomers and at least one other vinyl monomer, and their preparation are provided. Utilization of the acyl azide monomers avoids the problems in handling and storage of the moisture sensitive and toxic isocyanate monomers.

15 Claims, No Drawings

POLYMERS CONTAINING LATERALLY SUBSTITUTED ISOCYANATE GROUPS AND THEIR PREPARATION

BACKGROUND OF THE INVENTION

1. Field of Invention

The present invention relates to new polymers containing laterally substituted isocyanate groups and their preparation and particularly to polymers prepared from acyl azide monomers.

2. Description of Prior Art

Although the chemistry of isocyanates was studied extensively towards the end of the last century, interest in their technology started only in the last forty years, when the di- and trifunctional isocyanates began to be applied to the synthesis of various polymeric products.

The more important known reactions of the isocyanate groups, those with compounds containing one active hydrogen group are:

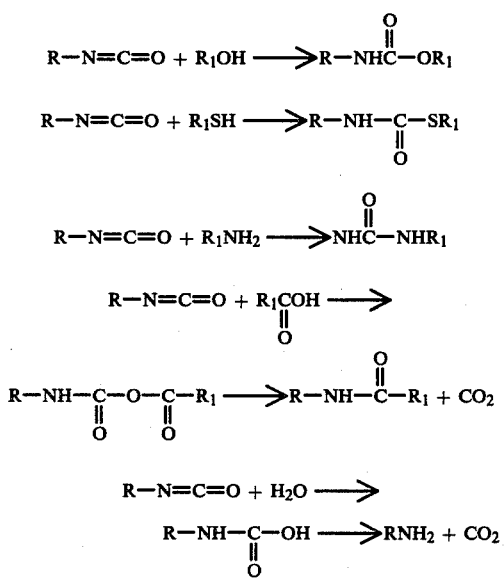

Generally, these reactions take place readily even at room temperature upon merely mixing the reagents. Compounds containing two or more substituents with active hydrogen groups similarly react with bi-functional or polyfunctional isocyanates to produce a great variety of polymers. The most important group of such products are the polyurethanes, known to the art as the reaction products from di- or polyols with di- or polyisocyanates and are defined as those containing the characteristic group

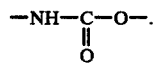

These polymers have different uses and applications such as plastic fibers, elastomers, adhesives, coatings, etc.

It is particularly desirable to synthesize polymers which possess various proportions of isocyanate groups laterally substituted on the main chain. Such polymers can be easily modified, by grafting or crosslinking reaction between the isocyanate groups and compounds containing active hydrogen groups. Another possibility is the reaction between two isocyanate groups, which results in the formation of a four-membered ring known as an uretidenedione. Homopolymers and copolymers of vinyl monomers containing isocyanate groups, are known to the art. Some typical examples are as follows: U.S. Pat. No. 2,606,892 describes copolymers of propenyl isocyanate with methyl acrylate. The copolymers obtained are claimed to impart special properties to textiles and to be useful as binders for various fillers. In the Japanese Pat. No. 5145 (1958)—see Chemical Abstracts 53, 10846 (1959)—a copolymer of isopropenylisocyanate with acrylonitrile is described for which better dyeing properties than these of the homopolyacrylonitrile are claimed. A recent article—J. Macromolecular Sci.—Chem. A5, (6), 1063 (1971) describes copolymers of vinyl isocyanate with styrene, methyl acrylate and fumaronitrile also mentioning some of their properties and their reactions with alcohols and amines.

The main problem rendering difficult the preparation of these isocyanates and their subsequent homopolymerization or copolymerization, is the usually great sensitivity of the isocyanate group to moisture. Particular caution in handling monomers containing isocyanates, and especially perfectly dry conditions, are required in carrying out their polymerization. Other disadvantages attendant on the utilization of isocyanate-containing vinyl monomers are their toxicity and their relatively short shelf-life due to their tendency to dimerize or trimerize.

SUMMARY OF THE INVENTION

The present invention provides new polymers containing laterally substituted isocyanate groups without starting with isocyanate-containing monomers. These new polymers have a relatively high content of laterally substituted isocyanate groups. The invention consists of novel polymers containing laterally substituted isocyanate groups obtained by polymerization acyl azide monomers with at least one vinyl monomer, in a free-radical initiator system.

DESCRIPTION OF THE INVENTION

The term polymerization is meant to include copolymerization of the acyl azide monomer with one or more vinyl monomers and/or diene. The vinyl monomers may be substituted or non-substituted and preferably contain no more than twenty carbon atoms in their structure. Examples of such vinyl monomers are acrylonitrile, dienes, butadiene, styrene, acrylates, etc. Instead of with a vinyl monomer, the acyl azide monomer can also be copolymerized with a double-bond-containing polymer, e.g. polybutadiene, poly(styrene-co-butadiene) etc.

Acyl azides are organic derivatives of hydrozoic acid which contain the group —CON$_3$. They may also be considered derivatives of carboxylic acids. One of the known methods for their preparation is the action of sodium azide on an acid chloride (acyl chloride). The pertinent reaction occurs smoothly at comparatively low temperature, usually between 0° C. and room-temperature. A detailed description is given in Helv. Chim. Acta 21, 1127 (1938). Some of the acyl azides e.g. cinnamoyl azide are relatively stable, inert to moisture and are handled easily. This can be considered as contributive to the advantages of the present invention, which avoids both the special reaction step of separately preparing the sensitive isocyanate-containing monomer and its subsequent handling and storage. Particularly useful for the present invention—as will be shown—are acryloyl azides containing an aromatic substituent represented by the general formula

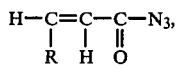

R being benzene, (cynnamoyl azide), substituted benzenes (methyl, methoxy, halogens, etc.) naphthalene, substituted naphthalenes, etc.

According to the present invention the polymerization technique for carrying out the reaction to obtain the new polymers may be any of the known methods for vinyl polymerization using a free-radical initiator system, namely bulk polymerization, suspension polymerization or solution polymerization using an inert solvent as the medium for the polymerization. Examples of free radical initiators are peroxides (benzoyl peroxide, cumene hydroperoxide, lauroyl peroxide, etc.), and azo compounds, e.g. azobis-iso-butyronitrile. The polymerization catalyst system which produces free-radicals may also be used in combination with a non-free radical accelerator. Alternatively, radiation-induced polymerization may be employed.

It was surprisingly found that after the reaction between the acyl azide monomer and the vinyl monomers is completed, no acyl azide groups are left in the polymer and that their place has been taken by a corresponding amount of isocyanate groups. When for example, cinnamoyl azide is used as the acyl azide in the copolymerization with a vinyl monomer, there concurrently occurs a Curtius rearrangement of the cinnamoyl azide to styrylisocyanate, which can also copolymerize with the same vinyl monomer to form the same copolymer type. The said rearrangement involved can schematically be shown as follows:

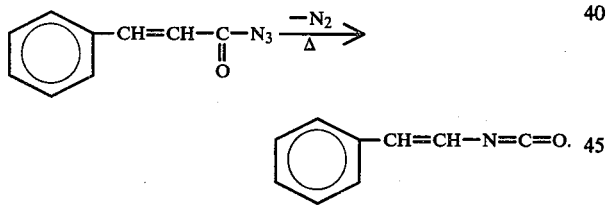

This fact was thoroughly investigated and could be proved by the fact that the polymerization took place regardless of whether to start with cinnamoyl azide or with styryl isocyanate. The same vinyl monomer was used in both cases. It was found that only one type of copolymer, e.g. poly(styrene styrylisocyanate), is obtained direct by free radical initiated copolymerization from the two different monomer pairs: styrene—styrylisocyanate and styrene—cinnamoyl azide. This was also proved by the identity of the infra-red spectra of the products obtained by the two different monomer pairs. This indicates that in this polymerization it is possible to replace the isocyanate-containing monomer with a corresponding monomer, but containing an azide group, and thus to eliminate the known disadvantages encountered in carrying out the polymerization with isocyanate containing monomers.

The reactivity ratios $r_1$ and $r_2$ of two monomers $M_1$ and $M_2$ are factors the numerical values of which express the reactivity of the two monomers with respect to each other during their copolymerization. They are the quantitative measures of the two monomers relative tendencies to attach themselves to a radical ending in one or the other monomer unit. The values of $r_1$ and $r_2$ can be determined from the copolymer composition as a function of the monomer feed composition. Depending on the molar feed ratio, $M_1/M_2$, and on the values of $r_1$ and $r_2$, the ratio between the unreacted monomers will as a rule change as polymerization proceeds giving rise to a continual change in the composition of the polymer formed at each moment.

The following Table 1 lists the reactivity ratios determined for acyl azide with some vinyl monomers:

Table 1

| Monomer pairs | reactivity ratios | | | |
|---|---|---|---|---|
| | $r_1$ | | $r_2$ | |
| Styrene-Cinnamoyl azide | 0.93 | ±0.08 | −0.7 | ±0.8 |
| Styrene-Styrylisocyanate | 7.8 | ±0.6 | 0 | ±0.3 |
| Acrylontrile-Cinnamoyl azide | 3.5 | ±0.5 | 0 | ±0.5 |
| Acrylonitrile-Styrylisocyanate | 9 | ±0.5 | 0 | ±0.5 |

The polymerization temperature may be varied within wide limits as in commonly the case with free-radical-initiated polymerization. In accordance with one embodiment of the invention, the temperature will not be increased beyond that temperature at which most of the acyl azides are transformed into their corresponding isocyanate-containing monomers. In this manner the copolymerization mechanism will be based mainly on the reaction, acyl azide—vinyl monomer, which is much faster than the reaction, isocyanate-containing monomer—vinyl monomer, as is clear from the reactivity ratios determined for such systems.

In accordance with another embodiment of the present invention, the acyl azide monomer is mixed with a vinyl monomer and the mixture is heated to a temperature at which the acyl azide is rapidly transformed in situ, into the corresponding isocyanate-containing monomer; for example, the optimal temperature for converting cinnamoyl azide to Styrylisocyanate is 80° C. Following this, the reaction will occur mainly between the newly formed isocyanate-containing monomer and the vinyl monomer. It was found that in the above-mentioned systems acyl azide—vinyl compound and isocyanate-containing monomer—vinyl compound the reactivity ratio for acyl azide is the higher one. For example, comparing the systems cinnamoyl azide—styrene and styrylisocyanate—styrene, at low conversion, it was found that in order to obtain a styrylisocyanate content of 10 mole percent in the copolymer, about 50 mole percent of styrylisocyanate are required in the starting feed, compared with only 10 mole percent when cinnamoyl azide is utilized as starting monomer. On the other hand, when styrylisocyanate monomer is used, no decomposition takes place, so that higher temperature than those permissible with cinnamoyl azide may be applied leading to higher reaction rates. Thus, in accordance with this embodiment, when the acyl azide is used as monomer, the disadvantage of having to handle an isocyanate-containing monomer is eliminated. The reaction is carried out at a temperature at which the acyl azide is transformed into an isocyanate-containing monomer. A person skilled in the art will select the proper temperature in accordance with the desired product and available facilities.

The new polymers obtained according to the present invention are characterized by the presence of lateral isocyanate groups in any desired concentration in the range of 1 to 35% (mole percent). These polymers can be easily modified by any of the known reactions characteristic of isocyanate groups. To name the reaction with water produces polymers containing amine groups. The new polymers also react readily with alcohols to yield the corresponding carbamates. Example: the reaction between poly(styrene-costyrylisocyanate) and ethanol resulted in a product with an infra-red spectrum in KBr showing a new absorption at 1740 cm$^{-1}$. This is characteristic of the carbamate group, whereas the absorption at 2260 cm$^{-1}$ characteristic of the isocyanate group, having largely disappeared. Similarly, the new polymers react with amines, yielding the corresponding substituted urea. By reactions with di and/or polyols, with di- and/or polyamines, with di- and/or polyacids, etc., grafted and cross-linked polymers can be obtained. These isocyanate-containing polymers can also react with polymers having functional groups containing active hydrogen to form block polymers and/or crosslinked products for use in coatings, adhesives, etc.

Various uses can be envisaged for these new polymers. They may serve as matrixes for attaching enzymes, or slow release pharmaceuticals, or as carriers for pesticides. Other advantages and uses were found in certain particular new polymers produced in accordance with the present invention. Thus, for example, in the copolymerization of cinnamoyl azide and acrylonitrile, a product containing about 10% (mole percent) laterally substituted isocyanate group was obtained in which the presence of the isocyanate groups improves the dyeing properties, as compared with the known polyacrylonitrile.

The copolymerization can be easily carried out following the known methods of vinyl polymerization. The acyl azide and the vinyl monomer are introduced into the reaction vessel together with the free radical initiator. The amount of initiator is generally between 0.01% and 5% by weight of the total feed introduced. After the sufficient time for polymerization to be completed has been allowed, the reaction vessel is cooled and the reaction product worked up by the conventional methods of filtration, precipitation, separation, drying, etc. The product is usually precipitated at low degrees of conversion or in solution. The choice of precipitant depends on the chemical structure of the copolymer and especially on the chemical stability of the particular isocyanate group. Thus, the copolymer poly(styrene-co-styrylisocyanate) can be precipitated even by ethanol (95%), whereas in poly(acrylonitrile-co-styrylisocyanate), the isocyanate group is very sensitive even to moist air, and dry benzene must be used as precipitant.

In the following Examples illustrating the invention all parts are by weight unless otherwise indicated.

EXAMPLE 1

A mixture consisting of 5.15 g styrene and 0.45 g cinnamoyl azide together with 5 mg of α,α-azobisisobutyronitrile (as initiator) was polymerized at 60° C. for about 7.5 hours. The product obtained, in an amount of 0.9 g consisted of poly(styrene-co-styrylisocyanate) having the form of a colorless powder and a melting point range of 125°–140° C. The glass transition temperature (Tg) determined by Ellery's method (J. Chem. Soc., (1958), p. 2638) was 105° C., and intrinsic viscosity [η], measured in a benzene solution in an Ubbelohda viscometer at 25° C., was 0.58 dl/g.

EXAMPLES 2–5

Working under the same conditions as in Example 1 the copolymers of different compositions as summarized in Table 2 were obtained from various monomer compositions:

Table 2

| | Monomers | | | Product Obtained | | |
|---|---|---|---|---|---|---|
| Ex. No. | Introduced Styrene (g) | Cinnamoyl Azide (g) | Yield (g) | Melting Point Ranges (°C.) | Tg (°C.) | [η] (dl/g) |
| 2 | 4.9 | 0.9 | 0.85 | 125–140 | 108 | 0.57 |
| 3 | 6.5 | 2.7 | 0.9 | 130–140 | 112 | 0.46 |
| 4 | 3.8 | 2.7 | 0.55 | 130–145 | 119 | 0.53 |
| 5 | 1.6 | 1.8 | 0.25 | 125–150 | 127 | 0.28 |

EXAMPLES 6–10

The copolymerization was similar to that described under Example 1, but the monomers present were acrylonitrile and cinnamoyl azide, the reaction time was 17 minutes and the reaction temperature 60° C. A summary of results is given in Table 3. It was noted that the product obtained, poly(acrylonitrile-co-styrylisocyanate), had a high reactivity due to the high sensitivity of the isocyanate groups to moisture, therefore, this copolymer was handled in a dry box.

Table 3

| | Monomers introduced | | Product obtained | | | |
|---|---|---|---|---|---|---|
| Example No. | Acrylonitrile (g) | Cinnamoyl Azide (g) | Yield (g) | Tg (°C.) | [η] [dl/g] | Determined in dimethylformamide |
| 6 | 3.43 | 0.40 | 0.25 | 87 | 6.5 | |
| 7 | 0.03 | 0.52 | 0.18 | 87 | | Not determined |
| 8 | 2.79 | 0.66 | 0.1 | 92 | 4.8 | |
| 9 | 2.79 | 1.03 | 0.1 | 94 | | Not determined |
| 10 | 2.49 | 1.12 | 0.06 | 94 | | Not determined |

EXAMPLES 11–16

The copolymerization was similar to that described under Example 1, but three monomers were present vis. styrene, acrylonitrile and cinnamoyl azide; the reaction time was about 20 minutes and the temperature 60° C. The results are summarized in Table 4. The product obtained, poly(styrene-co-acrylonitrile-co-styrylisocyanate) is soluble in benzene, methyl-ethyl-ketone and dimethyl formamide and insoluble in petroleum ether (b.p. 40°–60° C.).

Table 4

| Ex. No. | Monomers introduced | | | Product obtained | |
|---|---|---|---|---|---|
| | Styrene (g) | Acrylonitrile (g) | Cinnamoyl Azide (g) | Melting Range (°C.) | [η] in benzene (dl/g) |
| 11 | 6.60 | 0.53 | 3.44 | n.d. | 0.68 |
| 12 | 6.60 | 1.06 | 1.72 | 105–125 | n.d. |
| 13 | 6.24 | 1.59 | 1.72 | 115–125 | 0.7 |
| 14 | 8.32 | 0.53 | 1.72 | 110–125 | 1.0 |
| 15 | 6.24 | 1.06 | 3.44 | 110–125 | 0.67 |
| 16 | 5.20 | 1.69 | 3.44 | 115–125 | n.d. | n.d. = not determined

EXAMPLE 17

A mixture of 6.5 g styrene and 2.7 g cinnamoyl azide together with 0.1 g α,α'-azo-bisisobutyronitrile as initiator, was polymerized in 25 ml toluene at 50° C. during 6 hours. The product, precipitated by the addition of methanol, was identical with the products obtained in Examples 1–5, viz. poly(styrene-co-styrylisocyanate).

EXAMPLE 18

Room-temperature copolymerization of 10 g styrene together with 3 g cinnamoyl azide in the presence of 0.4 g benzoyl-peroxide as initiator and a few drops of dimethylaniline as accelerator, produces poly(styrene-co-styrylisocyanate) which is similar to the products obtained in Examples 1–5.

What is claimed is:

1. Polymers containing laterally substituted isocyanate groups obtained by polymerizing acyl azide monomers of the formula

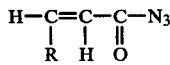

where R is an aromatic radical with at least one vinyl monomer, in a free-radical initiator system wherein the polymers contain only isocyanate groups that have replaced acyl azide groups and contain no residual acyl azide groups.

2. The polymers of claim 1, wherein the vinyl monomer has a maximum number of twenty carbon atoms in its structure.

3. The polymers of claim 2, wherein the vinyl monomer is selected from the group consisting of styrene, acrylonitrile and butadiene.

4. The polymers of claim 1, wherein the acyl azide monomers are selected from the group consisting of aromatic acyl azides.

5. The polymers of claim 4, wherein the aromatic acyl azide is cinnamoyl azide.

6. The polymers of claim 1, wherein the free radical initiator is selected from the group consisting of organic peroxides and azo-bisisobutyronitrile.

7. A method for the preparation of polymers containing laterally substituted isocyanate groups, by the polymerization of acyl azide monomers of the formula

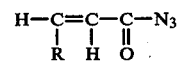

where R is an aromatic radical with at least one vinyl monomer in the presence of a free radical initiator system.

8. The method of claim 7, carried out at a temperature up to 70° C.

9. The method of claim 7, carried out at a temperature above the temperature of transformation of acyl azides into the corresponding isocyanate-containing monomers.

10. The method of claim 7, carried out in bulk polymerization.

11. The method of claim 7, carried out in solution.

12. The polymers prepared by the method of claim 8.

13. The polymers prepared by the method of claim 9.

14. The polymers prepared by the method of claim 10.

15. The polymers prepared by the method of claim 11.

* * * * *